W. H. HORNUM, 2 Sheets—Sheet 1.
Assignor, by mesne assignments, to THE RAILWAY REGISTER MANUFACTURING CO.
Fare Register.
No. 9,489. Reissued Dec. 7, 1880.
Fig. 1,
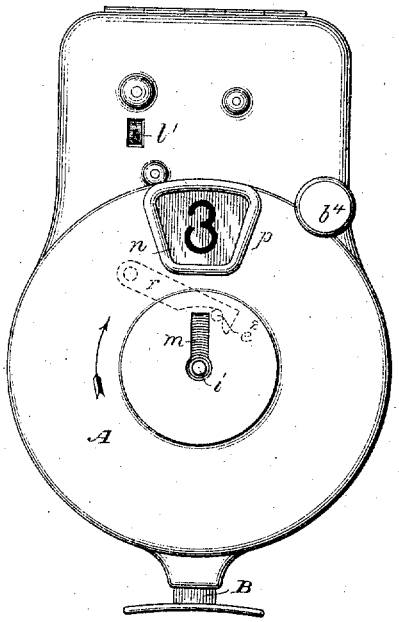
Fig. 2,
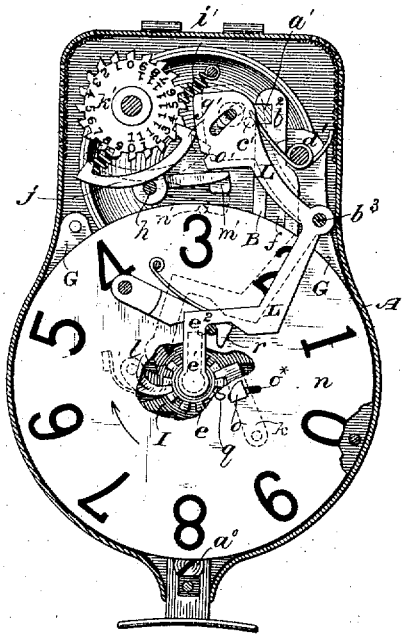
Fig. 3,
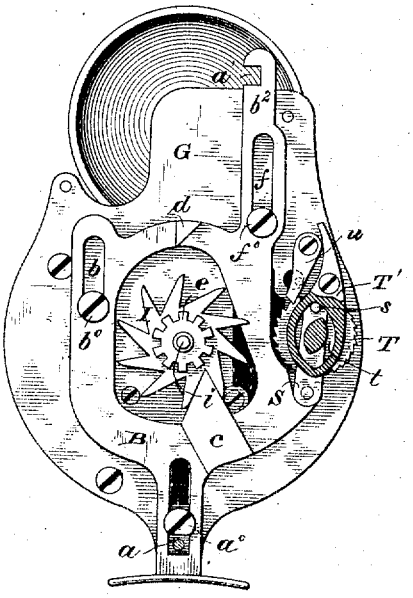
Fig. 4,
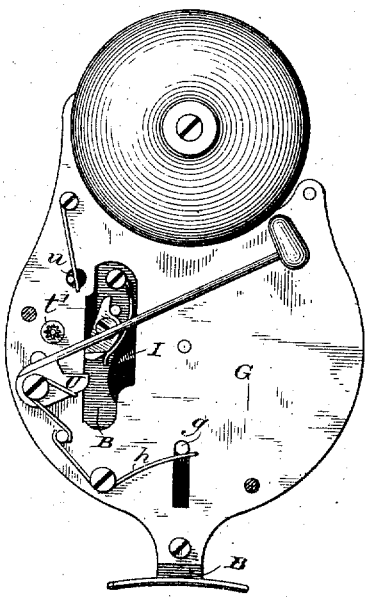
WITNESSES
Wm. A. Skinkle
Geo. W. Beck
INVENTOR
William H. Hornum.
By his Attorneys
Baldwin, Hopkins & Peyton.

W. H. HORNUM,
Assignor, by mesne assignments, to THE RAILWAY REGISTER MANUFACTURING CO.
2 Sheets—Sheet 2.
Fare Register.
No. 9,489.
Reissued Dec. 7, 1880.
Fig. 5,
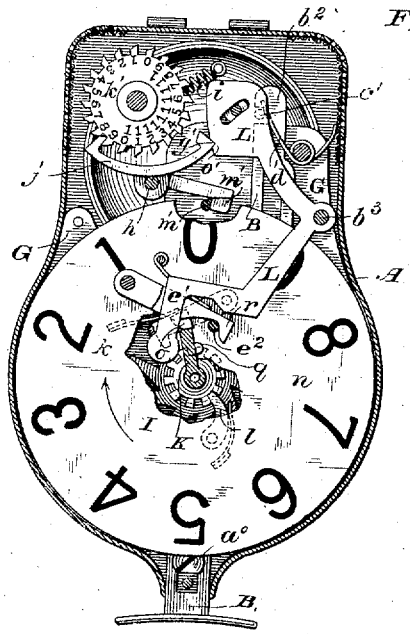
Fig. 6,
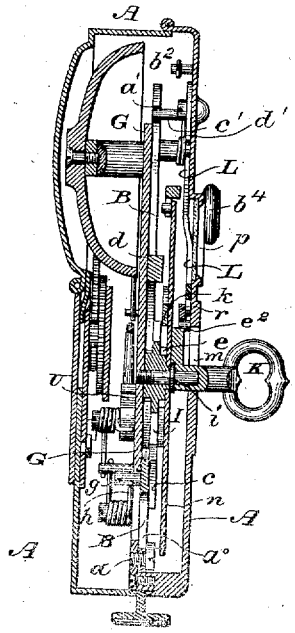
Fig. 7,
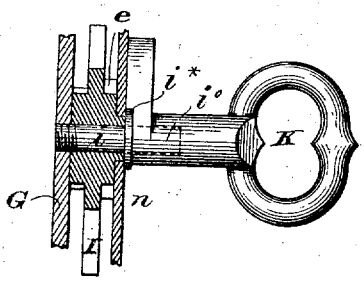
WITNESSES
Wm. A. Skinkle
Geo. N. Buck
INVENTOR
William H. Hornum,
By his Attorneys
Baldwin, Hopkins & Peyton.

UNITED STATES PATENT OFFICE.

WILLIAM H. HORNUM, OF NEW YORK, ASSIGNOR, BY MESNE ASSIGNMENTS, TO THE RAILWAY REGISTER MANUFACTURING COMPANY, OF BUFFALO, NEW YORK.

FARE-REGISTER.

SPECIFICATION forming part of Reissued Letters Patent No. 9,489, dated December 7, 1880.

Original No. 194,913, dated September 4, 1877; Reissue No. 9,008, dated December 30, 1879. Application for reissue filed June 29, 1880.

*To all whom it may concern:*

Be it known that I, WILLIAM H. HORNUM, a citizen of the United States, residing in the city, county, and State of New York, have invented certain new and useful Improvements in Fare-Registers, which improvements are fully set forth in the following specification.

My invention relates to counting or tallying machines more especially designed for fare-registering purposes, and belongs more particularly to the class of such registers now known as "duplex machines" or "registering-machines," in which are combined two sets of registering mechanism simultaneously operated in connection with an alarm by the same prime mover, one of said mechanisms being for the purpose of recording consecutively the number of fares taken on each trip of the car or vehicle, and capable of being set to zero or the starting-point at the beginning of each trip, constituting what is commonly called a "trip-register," while the other of said mechanisms is for the purpose of recording consecutively not only the number of fares collected on each single trip but the whole number collected on a series of consecutive trips, constituting what is now commonly called a "general," "permanent," or "continuously-counting" register.

By the employment of such a machine frauds and thefts by the receiver of the fares are prevented, the conductor of the car, driver of the vehicle, or collector being required, as each fare is received, to operate the register and sound the alarm, which notifies the passenger of the proper registry of his fare.

My present invention constitutes an improvement on the registers shown in Letters Patent No. 167,057, granted to John B. Benton, August 24, 1875, and in the several Letters Patent heretofore granted to the Hornum Patent Register Manufacturing Company as my assignee, one of which is dated December 25, 1877, and numbered (reissue number) 8,014, while another is No. 193,958, dated August 7, 1877; and my improved apparatus embodies in its organization a permanent or general register, a trip-register, an alarm, an actuator or prime mover common to said general and trip registers and to the alarm, mechanism to stop or prevent the trip-register from being turned or carried beyond zero or the starting-point independently of its prime mover, and mechanism which indicates the number of times said trip-register is reset or turned to the starting-point independently of the general register, while permitting said trip-register to be turned forward in the counting process consecutively and simultaneously with the general register past its zero or its starting-point without operating the indicator mechanism, said indicator mechanism registering, in other words, as resetting operations only the resetting movements of the trip-register which are independent of the movements of the general register and prime mover.

My said apparatus also embodies a key-hole guard, a key or device for resetting the trip-register independently of the general register, a latch or device for locking the prime mover of the register while resetting the trip-register, and a catch for retaining the said latch in its locking position and for imparting motion to the trip-indicator or zero-register.

My invention consists of certain new combinations of the devices or mechanism above enumerated, which are recited at the close of the specification, the object of this invention being to provide an improved duplex fare-register which is incapable of fraudulent manipulation on the part of the fare-collector or conductor.

In the accompanying drawings, which represent my said new combinations of mechanism as embodied and organized in the best way known to me at the date of filing my application for the original patent, Figure 1 is a face or front view of the apparatus closed up and ready for use. Fig. 2 is a similar view thereof, the cover or front plate of the inclosing casing being broken away to expose the internal parts of the mechanism. Fig. 3 is a face view of the partition-plate of the apparatus, which supports the principal working parts thereof. Fig. 4 is a rear view of said partition-plate, showing the alarm apparatus. Fig. 5 is a view similar to that depicted in Fig. 2, with the working parts in a different position.

Fig. 6 is a longitudinal central section through the machine; and Fig. 7 is a detached view of the resetting devices on a scale larger than that of the previous figures.

The casing A, which incloses the operative parts of the machine, is made of sheet metal or of any other suitable material, in the form best adapted for the purpose for which the register is to be used, the shape shown in the several figures being the better one for the reception of the mechanism as organized in the present instance.

In the casing A is situated a slide-actuator or prime mover, B, which serves to actuate the single-trip register and the general register simultaneously for consecutive counting in connection with the alarm, said alarm being sounded once for each actuation of the registering mechanism in the counting or tallying process to announce the proper operation of the machine and the registration of the fare. Said prime mover is guided in its reciprocations by pins or screws $a^o$ $b^o$ $f^o$, passing through slots $a$ $b$ $f$ therein into the upper side of a plate, G, (see Fig. 3,) which plate is secured in the casing A, and constitutes a central partition (running parallel with the front and back plates of the casing) between the single-trip register on one side and the general register and the alarm on the opposite side, while supporting the principal working parts of the apparatus.

The outer end of the prime mover extends through a slot in the edge of the casing, and is provided with a finger-piece by which to operate it. On the under surface of the prime mover is secured a pin, $g$, which extends through a slot in the partition-plate G, Fig. 4, and is acted upon by a spring, $h$, which spring has a tendency to throw the prime mover up to the position shown in the several figures of the drawings, which is the normal position of the prime mover, from which it is drawn outward, in the example I have shown, to actuate the machine. The said prime mover is provided with two teeth or pallets, $c$ $d$, which respectively engage with an escapement or ratchet-wheel, I, serving to impart motion to the single-trip register, with which it is connected, in the counting process. These pallets are situated on opposite sides of the escapement-wheel I, the pallet $c$ engaging one of its teeth when the prime mover is in its position of rest. When said prime mover is drawn out the pallet $d$ is caused to act on the escapement-wheel, causing it to turn for the space of half a tooth, while, as the prime mover recedes under the action of the returning or retracting spring $h$, the pallet $c$ acts on another tooth so as to turn said wheel the space of half a tooth, whereby for each down-and-up stroke of the prime mover or actuator the escapement-wheel is turned the complete distace or space of one tooth in the direction indicated by the arrows, Figs. 1, 2, and 5, and, as there are ten teeth in said wheel, for each actuation thereof the wheel is turned one-tenth of a revolution.

In the example represented by the drawings I have shown only the units-disk $n$ of the trip-register; but it will be understood that in practice a tens-disk to register tens will be combined with the units-disk, so that by the two disks I will be enabled to register consecutively on the trip-register ninety-nine fares before it reaches zero or the starting-point, as is usual in this class of machines.

The organization of the tens-disk with the units-disk is unnecessary to be shown, as it will be well understood by those skilled in the art, the organization being made in any of the well-known ways.

The units-disk $n$ is shown as marked with the figures from 0 to 9, as usual.

To the escapement-wheel I (which is, as will be understood, the actuating ratchet-wheel of the trip-register) is firmly secured or connected a toothed wheel, $e$, both these wheels being made to turn or rotate together on a pin, arbor, or axis, $i$, fixed in the partition-plate G.

The toothed wheel $e$ is provided with a tubular hub, which forms the bearing for the units-disk $n$, (see Figs. 6 and 7,) and on the under side of this units-disk are secured two pawls, $k$ $l$, which engage with the said toothed wheel $e$, so that when both pawls are in gear the units-disk cannot be turned in either direction independently of its actuating ratchet-wheel I and of the toothed wheel $e$, while movable with said wheels in the process of counting; but when the pawl $k$ is thrown out of gear the units-disk can be rotated in the direction indicated by the arrow in Figs. 1, 2, and 5, independently of said actuating-wheel and the wheel $e$ and of the prime mover, to reset it, but not in the opposite direction, owing to the engagement of the pawl $l$ with the said toothed wheel $e$.

Simultaneously with each actuation of the trip-register by the ratchet-wheel I the general register is also actuated by the prime mover to count or tally consecutively the same number as is recorded by the trip-register, as before stated, the actuating connection consisting, in the example shown, of a link, S, connected with the prime mover B at one end, and with an eccentric wrist-pin, $s$, secured to the face of a ratchet-wheel, T, at the other, said pin $s$ working in a cam-groove, $t$, formed in a plate, T′, situated in front of said ratchet-wheel. Said ratchet-wheel T is mounted on an arbor, which extends through the partition-plate G, and carries on its inner end a pinion-wheel, $t'$, Fig. 4, meshing with a cog-wheel mounted on the arbor of the units-hand of the general register to turn said register, which consists of a series of index-hands geared together, the first of which registers units, the next tens, the third hundreds, the fourth thousands, and so on, so that the said register, which cannot be reset or adjusted, will serve to control the single-trip register for an unlimited time.

A pawl, $u$, engages the ratchet-wheel T, to prevent it from being turned in the wrong direction, and compels a full movement of the prime mover in its reciprocation.

When the prime mover is drawn out and then allowed to recede, the eccentric-pin *s* moves down through one side of the cam-groove *t* and up through the opposite side, so that the ratchet-wheel T is compelled to make a complete revolution in the right direction. If the prime mover be drawn out partially only and then released, the ratchet-wheel T is arrested by the pawl *u*, and the prime mover cannot recede until drawn out to its full extent.

The alarm is also operated once for each actuation of the trip and general registers by the prime mover by means of a tappet or pawl arrangement, U, (shown in Fig. 4;) but inasmuch as both the construction of the alarm devices and of the general register, which I have shown, is substantially similar to that of my Patent No. 185,536, dated December 19, 1876, I deem it unnecessary to give detail description thereof in the present case.

The units-disk of the trip-register is retained on the tubular hub of the toothed wheel *e* by a flange, $i^*$, formed on the pin or axis *i*, Figs. 6 and 7, and from this flange rises a stud, $i^o$, for the reception of a key, K, which is inserted through a key-hole, *m*, Fig. 1, in the cover or face-plate of the casing to reset the trip-register.

From the pawl *k*, pivoted to the under side of the units-disk of the trip-register, a tappet or projection, *o*, extends through a curved slot, $o^*$, Fig. 2, in said units-disk, said tappet and slot being in such relation to the key-hole *m* and to the zero (0) mark on the units-disk that the key cannot be inserted in said hole when said tappet is situated between the key-hole and the zero-mark, which is at the time the register stands at zero, or the point indicative of no registration, while said key cannot be withdrawn after having been inserted to reset the register, except when the trip-register is at zero, as will be presently more fully explained.

When either of the figures 1 to 9 of the trip-disk—for instance, the figure 3—stands opposite the window or opening *p* in the casing through which the count or tally of the trip-register is read and exposed, as usual, and it is desired to turn the trip-register to zero by means of the key K, (which is the resetting device I employ in the example shown,) the key is inserted through the key-hole *m* and turned in the direction indicated by the arrows on Figs. 1, 2, and 5. The face of the tappet *o* of the pawl *k* is rounded, and as the bit of the key strikes this face it slides under the tappet and forces or throws the pawl *k* out of engagement with the toothed wheel *e*. At the same time the bit of the key strikes a fixed pin, *q*, secured to or projecting from the units-disk near to and inside the slot $o^*$, Fig. 2, so that it cannot slip past or from under the tappet *o*, and as the turning of the key is continued the units-disk is compelled to rotate with it. When said key has been turned sufficiently to bring its bit beneath the key-hole, which is at the time the disk is at zero, the key can be withdrawn; but it cannot be withdrawn before the units-disk has reached this zero position, as will be obvious.

A pawl or stop, *r*, secured on the inside of the cover, prevents the key being turned backward in the direction opposite to that indicated by the arrows, in order to get it out, without turning the units-disk to zero, which movement, if possible, would enable the operator to commit frauds. Said pawl *r* is so arranged that it yields or swings out of the way when the key is turned in the direction indicated by the arrows, a suitable spring acting thereon. The pawl *k* is held in gear with the toothed wheel *e* by a spring, and if an attempt is made to manipulate the registering mechanism with a key the bit of which is not long enough to strike against the pawl *r* to prevent back movement, said pawl *k* remains in gear with the toothed wheel, and the units-disk cannot be turned by the key.

The prime mover B is provided with an extension, $b^2$, near the upper end of which is a notch, $a'$, and close beneath the cover of the casing A is situated a latch, L, which can be turned or vibrated by means of an arbor or shaft, $b^3$, that projects through the cover and is provided with a button, $b^4$, to work it, so that a nose or pin, $c'$, which is secured on said latch, can be thrown in gear with the notch, $a'$, as shown in Fig. 5, so as to lock the prime mover from its reciprocating movement. A spring, $d'$, forces the latch back to the position shown in Fig. 2.

On the inner end of the latch L is secured an arm, $e'$, which extends down, and which, when the latch is in the position shown in Fig. 2, covers the key-hole *m*, and consequently forms a key-hole guard, said arm being retained in that position by a pin, $c^2$, in the cover of the casing, against which pin said arm is forced by the spring $d'$. By turning the latch to the position shown in Fig. 5, against the force of spring $d'$, the key-hole guard is caused to swing from under the key-hole, so that it leaves the same free for the entrance of the key to reset the register, while the prime mover will be locked from movement.

If the latch L is thrown in gear with the prime mover, it is retained in that position by a catch, $g'$, which swings on a pivot, $h'$, on the inside of the casing-cover, and is exposed to the action of a spring, $i'$, which has a tendency to throw said catch down to the position shown in Fig. 5. With this catch is combined an anchor, *j*, which engages with an escapement-wheel, $k'$, so that each time the catch drops down the escapement-wheel is turned half a tooth, and when the catch rises the escapement-wheel is turned again half a tooth. The face of this escapement-wheel forms a dial, which I term the "trip-indicator" or "zero-register," and which contains a series of figures or signs, one of which is visible through an aperture, $l'$, Fig. 1, in the cover of the casing whenever the escapement-wheel has been turned the distance of a full tooth; but at the time the catch $g'$ occupies the position shown in Fig. 5 the figure or sign on the trip-indicator or zero-register which had previously been exposed to view is displaced, and the succeeding figure or sign is not yet visible. By these means the movements of the latch L are recorded, and since the latch is only moved when the register is to be turned to zero, which is usually done at the end of each half-trip, the trip-indicator or zero-register shows when and how many times the single-trip register has been set to zero by the resetting mechanism independently of the prime mover and general register, and on which of its trips the car or other vehicle is running.

On the catch $g'$ is secured a toe, $m'$, and when the catch has been depressed to the position shown in Fig. 5 the outer end of this toe assumes such a position that a tooth or pin, $n'$, projecting from the units-disk $n$, strikes the same at the moment the single-trip register has been turned to zero.

When the catch $g'$ is in its locking position, as shown in Fig. 5, it engages with a V-shaped notch, $o'$, in the edge of the locking-latch L, so that it requires a certain power to throw it out of gear. As soon as the tooth $n'$ strikes the toe $m'$ a slight pressure on the key in the direction of the arrows, Figs. 1, 2, and 5, releases the catch $g'$, leaving the key in position to be withdrawn. At the same time the tappet $o$, being forced outward by the bit of the key, strikes the fixed pin $e^2$, thus preventing the units-disk from being turned beyond zero by means of the resetting device or key. As soon as the key is withdrawn the spring $d'$ forces the locking-latch L back to the position shown in Fig. 2, (which is its normal position,) the trip-indicator $k'$ advances the second half tooth, and the key-hole guard covers the key-hole, and the tappet $o$ recedes, so that when the trip-register is actuated by the prime mover said tappet and the fixed pin $e^2$ form no obstruction to its motion. While the prime mover is locked by the latch L and the single-trip register is free to be set to zero, neither the general register nor the alarm mechanism can be moved, and the indication of the trip-indicator or zero-register is displaced, and it does not show any new indication until the prime mover is released, which can only be accomplished in the organization I have shown by resetting the trip-register to zero by the resetting mechanism.

The locking-latch, the key-hole guard, and the trip-indicator or zero-register can be applied to fare-registers of constructions differing somewhat from that shown and described. Instead, also, of the units-disk a trip-hand arrangement may be substituted, while the construction of the general register which I have shown may be changed without departure from my invention.

What I claim as new, and desire to secure by Letters Patent, is—

1. The combination, substantially as hereinbefore set forth, of a registering mechanism adapted to be turned to zero by a key independently of the prime mover which operates it in the process of counting, an alarm, a prime mover common to said mechanism and alarm, and a key-hole guard connected with a latch which serves to lock the prime mover while the register is being reset, and can only be released by turning the register to zero or the starting-point.

2. The combination of a single-trip register adapted to be set to zero by a key independently of the prime mover which operates it in the process of counting, a general register, an alarm, a prime mover common to said registers and alarm, and a key-hole guard connected with a latch which serves to lock the prime mover while the single-trip register is being reset, and can only be released by turning the single-trip register to the zero or starting point.

3. The combination, substantially as hereinbefore set forth, of a registering mechanism adapted to be set forward to zero independently of its prime mover, a prime mover adapted to impart to the registering mechanism a step-by-step movement, and a setting device, substantially as described, adapted to turn the register in one direction only to zero, and no farther, while the register, when actuated by its prime mover, can move freely beyond zero.

4. The combination, substantially as hereinbefore set forth, of a single-trip register, a general register, a prime mover common to both, a device for setting the single-trip register forward to zero independently of the general register, and mechanism which prevents the single-trip register from moving past zero when operated by the setting device, but allows the same to move past said point when actuated by the prime mover.

5. The combination, substantially as hereinbefore set forth, of a single-trip register, a general register, an alarm, a prime mover common to all three, a setting device for moving the single-trip register forward to zero independently of the general register and of the alarm, and mechanism which prevents the single-trip register from moving past zero when operated by the setting device, but allows the same to move past said point when actuated simultaneously with the general register.

6. The combination, substantially as hereinbefore described, of a registering mechanism, a prime mover for imparting a step-by-step movement to said registering mechanism, a device for turning the registering mechanism to zero independently of its prime mover, a trip-indicator or zero-register for indicating when the registering mechanism has been set to zero by the said device, and mechanism to lock the prime mover and displace the indication of the trip-indicator or zero-register.

7. The combination, substantially as hereinbefore described, of a registering mechanism, an alarm, a prime mover common to both, a device for turning the registering mechanism to zero independent of its prime mover, a trip-indicator or zero-register for indicating when the registering mechanism has been set to zero by the said device, and mechanism to lock the prime mover and displace the indication of the trip-indicator or zero-register.

8. The combination, substantially as hereinbefore described, of a single-trip register, a general register, an alarm, a prime mover common to all three, a device for turning the single-trip register to zero independent of its prime mover, a trip-indicator or zero-register for indicating when the single-trip register has been set to zero by said device, and mechanism to lock the prime mover and displace the indication of the trip-indicator or zero-register.

9. The combination, substantially as hereinbefore set forth, of a registering mechanism, a prime mover for imparting a step-by-step movement to the registering mechanism, a device for setting the registering mechanism to zero independent of its prime mover, a trip-indicator or zero-register, and connecting mechanism, substantially as described, so constructed that the registering mechanism cannot be set to zero independently of its prime mover without operating the trip-indicator or zero-register, and the trip-indicator or zero-register can only be changed to show another indication or sign by operating the device for setting the registering mechanism to zero independent of the prime mover, substantially as described.

10. The combination, substantially as hereinbefore set forth, of a registering mechanism adapted to be set to zero at will independently of its prime mover, a prime mover for actuating the registering mechanism, a trip-indicator, a mechanism which prevents the registering mechanism from being moved independently of its prime mover without first displacing the indication or sign of the trip-indicator or zero-register, and which does not allow the trip-indicator or zero-register to show another indication or sign before the registering mechanism has been set to zero.

11. The combination, in a fare-register, of a single-trip register for recording the fares collected on each trip or half-trip, a general register for making a permanent record of the fares collected during a period of time, an alarm to announce the recording of each fare, a prime mover actuating said trip and general registers and the alarm by independent connections, a trip-indicator or zero-register incapable of being changed to another indication or sign without setting the single-trip register to zero by its resetting mechanism, and a surrounding casing provided with slots or openings for inspecting the various indications or signs, all constructed and adapted to operate substantially as shown and described.

12. The combination, substantially as hereinbefore set forth, of a registering mechanism, a prime mover adapted to impart to the registering mechanism a step-by-step movement, a key for turning the registering mechanism to zero independently of its prime mover, a trip-indicator or zero-register for indicating when the register has been set to zero, a key-hole guard connected to a latch which serves to lock the prime mover, and a catch which serves to retain the latch in its locking position and to displace the indication of the trip-indicator or zero-register.

13. The combination, substantially as hereinbefore set forth, of a registering mechanism, an alarm, a prime mover common to both, a key for turning the register to zero independently of its prime mover, a trip-indicator or zero-register for indicating when the register has been turned to zero, a key-hole guard connected to a latch which serves to lock the prime mover, and a catch which serves to retain the latch in its locking position and to displace the indication of the trip-indicator or zero-register.

14. The combination, substantially as hereinbefore set forth, of a single-trip register, a general register, an alarm, a prime mover common to all three, a key for turning the single-trip register to zero independently of its prime mover, a trip-indicator or zero-register for indicating when the register has been turned to zero, a key-hole guard connected to a latch which serves to lock the prime mover, and a catch which retains the latch in its locking position and serves to displace the indication of the trip-indicator or zero-register.

15. The combination, substantially as hereinbefore set forth, of a registering mechanism, a prime mover for imparting a step-by-step movement to said registering mechanism, a device for turning the register to zero independently of its prime mover, a trip-indicator or zero-register for indicating when the register has been turned to zero, a latch which serves to lock the prime mover, a catch which serves to retain the latch in its locking position, and a pin or equivalent device which is connected to the registering mechanism and serves to actuate the catch so as to release the prime mover and to change the indication of the trip-indicator or zero-register at the time the registering mechanism has been turned to zero.

16. The combination, substantially as hereinbefore set forth, of a registering mechanism, an alarm, a prime mover common to both, a device for turning the register to zero independently of its prime mover, a trip-indicator or zero-register for indicating when the register has been turned to zero, a latch which serves to lock the prime mover, a catch which serves to retain the latch in its locking position, and a pin or equivalent device which is connected to the registering mechanism and serves to actuate the catch so as to release the prime mover and to change the indication of the trip-indicator or zero-register at the time the registering mechanism has been turned to zero.

17. The combination, substantially as hereinbefore set forth, of a single-trip register, a general register, an alarm, a prime mover common to all three, a device for turning the single-trip register to zero independent of the prime mover, a trip-indicator or zero-register for indicating when the single-trip register has been turned to zero, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism has been turned to zero.

18. The combination, substantially as hereinbefore set forth, of a registering mechanism, a prime mover for imparting a step-by-step movement to said registering mechanism, a device for turning the register to zero independent of its prime mover, a zero-stop, a trip-indicator or zero-register for indicating when the register has been turned to zero independent of its prime mover, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism is held by the zero-stop.

19. The combination, substantially as hereinbefore set forth, of a registering mechanism, an alarm, a prime mover common to both, a device for turning the register to zero independent of its prime mover, a zero-stop, a trip-indicator or zero-register for indicating when the register has been turned to zero independent of its prime mover, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism is held by the zero-stop.

20. The combination, substantially as hereinbefore set forth, of a single-trip register, a general register, an alarm, a prime mover common to all three, a device for turning the single-trip register to zero independent of its prime mover, a zero-stop, a trip-indicator or zero-register for indicating when the single-trip register has been turned to zero independent of its prime mover, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism is held by the zero-stop.

21. The combination, substantially as hereinbefore set forth, of a registering mechanism, a prime mover for imparting a step-by-step movement to said registering mechanism, a key for turning the register to zero independent of its prime mover, a zero-stop which, when acted on by the key, retains the register at zero, but allows said register to turn freely past zero when the key is withdrawn, a trip-indicator or zero-register for indicating when the register has been turned to zero by the key, a latch which serves to lock the prime mover, a catch for retaining the latch in its locking position, and a pin or equivalent device which is connected to the registering mechanism and serves to actuate the catch so as to release the prime mover and to change the indication of the trip-indicator or zero-register at the time the registering mechanism is held by the zero-stop.

22. The combination of a registering mechanism, an alarm, a prime mover common to both, a key for turning the register to zero independent of its prime mover, a zero-stop which, when acted on by the key, retains the register at zero, but allows said register to turn freely past zero when the key is withdrawn, a trip-indicator or zero-register for indicating when the register has been turned to zero by the key, a latch which serves to lock the prime mover, a catch for retaining the latch in its locking position, and a pin or equivalent device which is connected to the registering mechanism and serves to actuate the catch so as to release the prime mover and to change the indication of the trip-indicator or zero-register at the time the registering mechanism is held by the zero-stop.

23. The combination, in a fare-register, of a single-trip register, a general register, an alarm, a prime mover common to all three, a key for turning the single-trip register to zero independent of its prime mover, a zero-stop which, when acted on by the key, retains the single-trip register at zero, but allows said register to turn freely when the key is withdrawn, a trip-indicator or zero-register for indicating when the register has been turned to zero by the key, a latch which serves to lock the prime mover, a catch for retaining the latch in its locking position, and a pin or equivalent device which is connected to the registering mechanism and serves to actuate the catch so as to release the prime mover and to change the indication of the trip-indicator or zero-register at the time the single-trip register is held by the zero-stop, substantially as set forth.

In testimony whereof I hereunto subscribe my name.

WILLIAM H. HORNUM.

Witnesses:
WM. CARY SANGER,
THOS. T. SHERMAN.